United States Patent
Wakita et al.

(10) Patent No.: US 8,377,598 B2
(45) Date of Patent: Feb. 19, 2013

(54) BATTERY HAVING AN ELECTROLYTIC SOLUTION CONTAINING DIFLUOROETHYLENE CARBONATE

(75) Inventors: Shinya Wakita, Fukushima (JP); Izaya Okae, Fukushima (JP); Hiroyuki Yamaguchi, Fukushima (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 1189 days.

(21) Appl. No.: 11/859,600

(22) Filed: Sep. 21, 2007

(65) Prior Publication Data
US 2008/0076032 A1 Mar. 27, 2008

(30) Foreign Application Priority Data

Sep. 22, 2006 (JP) ................... 2006-257595
Jul. 24, 2007 (JP) ................... 2007-192174

(51) Int. Cl.
*H01M 6/16* (2006.01)
(52) U.S. Cl. ............. 429/337; 429/231.8; 429/324; 429/329; 429/338

(58) Field of Classification Search ............. 429/231.8, 429/324, 329, 337, 338
See application file for complete search history.

(56) References Cited

U.S. PATENT DOCUMENTS

| 7,947,092 B1 * | 5/2011 | Nagata et al. ............. 29/623.5 |
| 2009/0053598 A1 * | 2/2009 | Abe et al. ................. 429/199 |

FOREIGN PATENT DOCUMENTS

| JP | 9-204936 | 8/1997 |
| JP | 2000-223368 | 8/2000 |
| JP | 2004-319317 | 11/2004 |
| JP | 2004319317 A * | 11/2004 |
| JP | 2007-335406 | 12/2007 |
| WO | 2006/077763 | 1/2006 |
| WO | WO 2006077763 A1 * | 7/2006 |

* cited by examiner

*Primary Examiner* — Zachary Best
(74) *Attorney, Agent, or Firm* — K&L Gates LLP

(57) ABSTRACT

A battery capable of obtaining the high energy density and obtaining the superior cycle characteristics is provided. In an anode, the thickness of a single face of an anode active material layer containing a carbon material as an anode active material is from 75 μm to 120 μm. An electrolytic solution contains difluoroethylene carbonate as a solvent. Thereby, the energy density of the anode is improved, and the diffusion and the acceptance of lithium ions in the anode are improved.

7 Claims, 2 Drawing Sheets

US 8,377,598 B2

BATTERY HAVING AN ELECTROLYTIC SOLUTION CONTAINING DIFLUOROETHYLENE CARBONATE

CROSS REFERENCES TO RELATED APPLICATIONS

The present application claims priority to Japanese Patent Application JP 2006-257595 filed in the Japanese Patent Office on Sep. 22, 2006 and Japanese Patent Application JP 2007-192174 filed in the Japanese Patent Office on Jul. 24, 2007, the entire contents of which is being incorporated herein by references.

BACKGROUND

The present application relates to a battery using a carbon material as an anode active material.

In recent years, downsizing and weight saving of portable electronic devices represented by a mobile phone, a PDA (Personal Digital Assistant), and a notebook personal computer have been actively promoted. As a part thereof, improving the energy density of a battery as a driving power source for such electronic devices, in particular, the energy density of a secondary battery has been strongly desired.

As a secondary battery capable of providing a high energy density, for example, the secondary batteries using lithium (Li) as an electrode reactant are known. Specially, the lithium ion secondary batteries using a carbon material capable of inserting and extracting lithium for the anode are widely used practically. However, in the lithium ion secondary battery using the carbon material for the anode, the technique has been already developed to the degree close to its theoretical capacity. Therefore, as a method to further improve the energy density, it has been considered that the thickness of the active material layer is thickened to increase the ratio of the active material layer in the battery, and the ratios of the current collector and the separator are lowered (for example, refer to Japanese Unexamined Patent Application Publication No. 9-204936).

However, when the thickness of the active material layer is increased without changing the volumetric capacity of the battery, the area of the current collector is relatively decreased. Therefore, when charged, the current density to the anode is increased. In the result, capacities of diffusion of lithium ions and electrochemical reception of lithium ions in the anode fall short, and thus metal lithium is easily precipitated. The metal lithium precipitated in the anode as above is easily deactivated, leading to enormous lowering of the cycle characteristics. Consequently, it has been difficult to increase the thickness of the active material layer.

SUMMARY

In view of the foregoing, it is desirable to provide a battery capable of providing a high energy density and providing superior cycle characteristics.

According to an embodiment, there is provided a battery including a cathode, an anode, and an electrolytic solution. The anode has an anode active material layer containing a carbon material and being from 75 µm to 120 µm thick. The electrolytic solution contains a solvent containing difluoroethylene carbonate (DFEC).

According to the battery of an embodiment, the high energy density can be obtained by increasing the thickness of the anode active material layer. In addition, since the solvent in the electrolytic solution contains difluoroethylene carbonate, a coat is formed on the surface of the active material layer. In the result, the diffusion and the acceptance of lithium ions are improved, and decomposition of the electrolytic solution due to charge and discharge is inhibited.

According to the battery of an embodiment, the thickness of the anode active material layer is increased, and difluoroethylene carbonate is contained in the electrolytic solution. Therefore, the energy density can be improved, and superior cycle characteristics can be obtained.

Additional features and advantages are described herein, and will be apparent from, the following Detailed Description and the figures.

DETAILED DESCRIPTION

An embodiment will be hereinafter described in detail with reference to the drawings.

Figure 1:
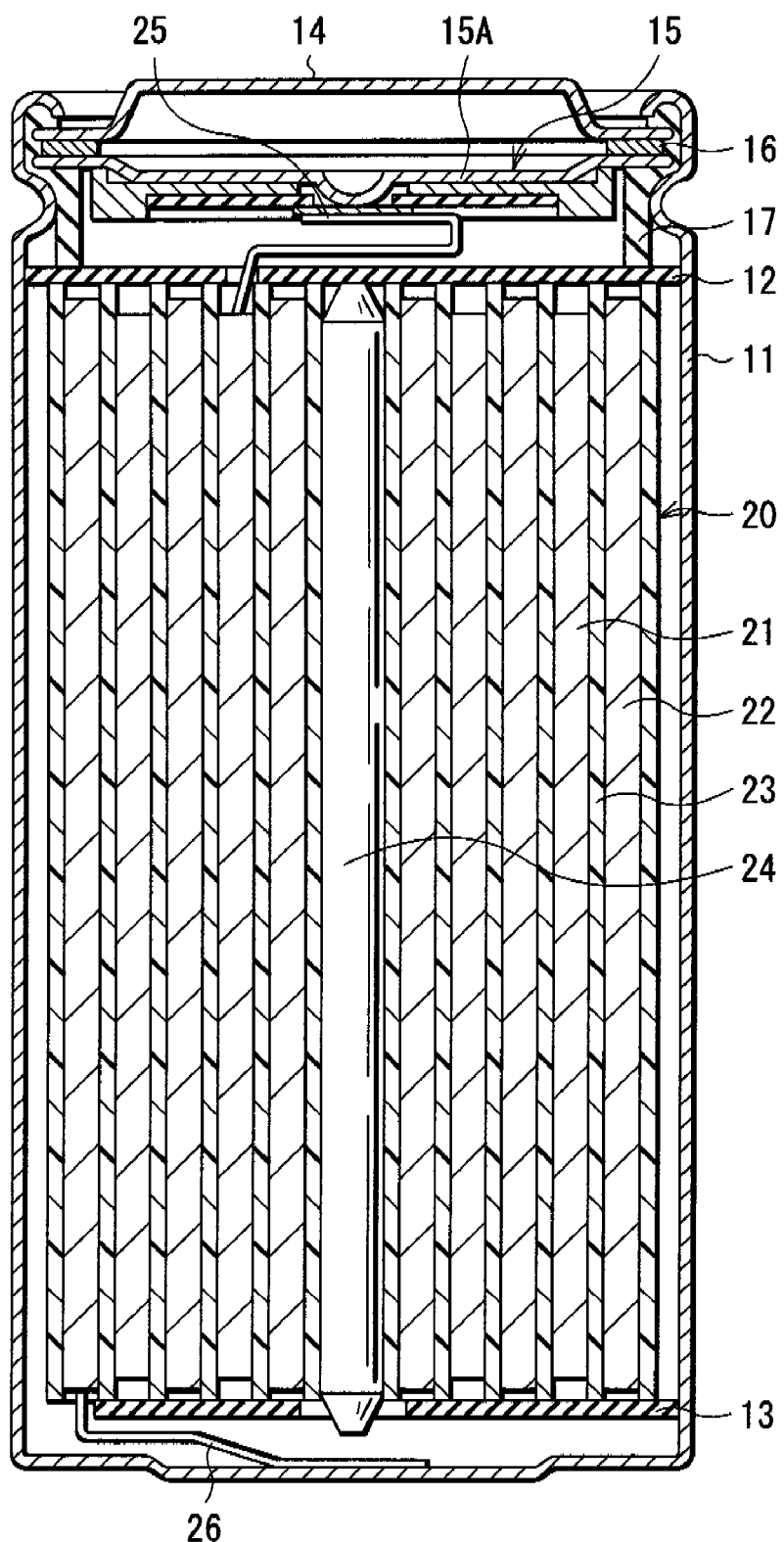
FIG. 1 is a cross section showing a structure of a secondary battery according to an embodiment.

FIG. 1 shows a cross sectional structure of a secondary battery according to an embodiment of the application. The secondary battery is a so-called cylinder type battery, and has a spirally wound electrode body 20 in which a strip-shaped cathode 21 and a strip-shaped anode 22 are spirally wound with a separator 23 in between inside a battery can 11 in the shape of an approximately hollow cylinder. The battery can 11 is made of, for example, iron (Fe) plated by nickel (Ni). One end of the battery can 11 is closed, and the other end of the battery can 11 is opened. Inside the battery can 11, a pair of insulating plates 12 and 13 is respectively arranged perpendicular to the winding periphery face, so that the spirally wound electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is, for example, made of a material similar to that of the battery can 11. The safety valve mechanism 15 is electrically connected to the battery cover 14 through the PTC device 16. When the internal pressure of the battery becomes a certain level or more due to internal short circuit, external heating or the like, a disk plate 15A flips to cut the electrical connection between the battery cover 14 and the spirally wound electrode body 20. When temperature rises, the PTC device 16 limits a current by increasing the resistance value to prevent abnormal heat generation by a large current. The gasket 17 is made of, for example, an insulating material and its surface is coated with asphalt.

For example, a center pin 24 is inserted in the center of the spirally wound electrode body 20. A cathode lead 25 made of aluminum (Al) or the like is connected to the cathode 21 of the spirally wound electrode body 20. An anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Figure 2:
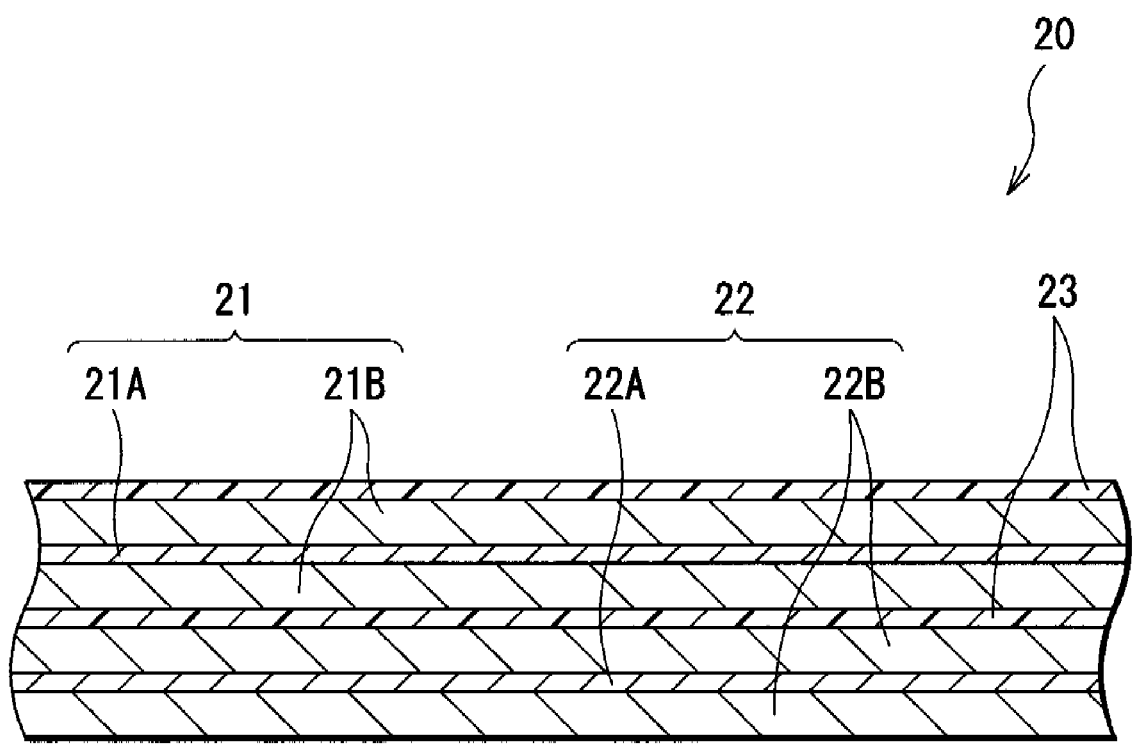
FIG. 2 is a cross section showing an enlarged part of a spirally wound electrode body in the secondary battery shown in FIG. 1.

FIG. 2 shows an enlarged part of the spirally wound electrode body 20 shown in FIG. 1. The cathode 21 has a structure in which, for example, a cathode active material layer 21B is provided on the both faces of a cathode current collector 21A having a pair of opposed faces. Though not shown, the cathode active material layer 21B may be provided on only a single face of the cathode current collector 21A. The cathode current collector 21A is, for example, made of a metal foil such as an aluminum foil, a nickel foil, and a stainless foil.

The cathode active material layer 21B contains, for example, as a cathode active material, one or more cathode materials capable of inserting and extracting lithium as an electrode reactant. As a cathode material capable of inserting and extracting lithium, for example, a lithium-containing compound such as a lithium oxide, a lithium sulfide, an intercalation compound containing lithium, and a lithium phosphate compound can be cited. Specially, a complex oxide containing lithium and a transition metal element or a phosphate compound containing lithium and a transition metal element is preferable. In particular, a compound containing at least one of cobalt (Co), nickel, manganese (Mn), iron, aluminum, vanadium (V), and titanium (Ti) as a transition metal element is preferable. The chemical formula thereof is expressed by, for example, LixMIO2 or LiyMIIPO4. In the formula, MI and MII include one or more transition metal elements. The values of x and y vary according to the charge and discharge state of the battery, and are generally in the range of $0.05 \leq x \leq 1.10$ and $0.05 \leq y \leq 1.10$.

As a specific example of the complex oxide containing lithium and a transition metal element, a lithium cobalt complex oxide (LixCoO2), a lithium nickel complex oxide (LixNiO2), a lithium nickel cobalt complex oxide (LixNi1-zCozO2 (z<1)), a lithium nickel cobalt manganese complex oxide (LixNi(1-v-w)CovMnwO2 (v+w<1)), lithium manganese complex oxide having a spinel structure (LiMn2O4) or the like can be cited. As a specific example of the phosphate compound containing lithium and a transition metal element, for example, lithium iron phosphate compound (LiFePO4) or a lithium iron manganese phosphate compound (LiFe1-uMnuPO4 (u<1)) can be cited.

As a cathode material capable of inserting and extracting lithium, other metal compound or a polymer material can be cited. As other metal compound, for example, an oxide such as titanium oxide, vanadium oxide, and manganese dioxide, or a disulfide such as titanium sulfide and molybdenum sulfide can be cited. As a polymer material, for example, polyaniline or polythiophene can be cited.

If necessary, the cathode active material layer 21B may contain an electrical conductor or a binder. As an electrical conductor, for example, a carbon material such as graphite, carbon black, and Ketjen black can be cited. One thereof is used singly, or two or more thereof are used by mixing. Further, in addition to the carbon material, a metal material, a conductive polymer material or the like may be used, as long as the material has conductivity. As a binder, for example, a synthetic rubber such as styrene-butadiene rubber, fluorinated rubber, and ethylene propylene diene rubber, or a polymer material such as polyvinylidene fluoride can be cited. One thereof is used singly, or two or more thereof are used by mixing.

The anode 22 has a structure in which an anode active material layer 22B is provided on the both faces of an anode current collector 22A, for example. Though not shown, the anode active material layer 22B may be provided only on a single face of the anode current collector 22A. The anode current collector 22A is made of, for example, a metal foil such as a copper foil, a nickel foil, and a stainless foil.

The anode active material layer 22B contains, for example, as an anode active material, one or more anode materials capable of inserting and extracting lithium as an electrode reactant. If necessary, the anode active material layer 22B may contain a binder similar to that of the cathode active material layer 21B, for example. As an anode material capable of inserting and extracting lithium, for example, a carbon material such as graphite, non-graphitizable carbon, and graphitizable carbon can be cited. Such a carbon material is preferable, since a change in crystal structure generated when charged and discharged is very little, a high charge and discharge capacity can be obtained, and favorable charge and discharge cycle characteristics can be obtained. In particular, graphite is preferable since graphite has a large electrochemical equivalent and provides a high energy density. Both natural graphite and artificial graphite may be used.

As graphite, graphite in which the lattice spacing d002 in the C-axis direction in X-ray diffraction is 0.335 nm or more and less than 0.338 nm is preferable. Thereby, higher energy density can be obtained. The lattice spacing d002 can be measured by X-ray diffraction method in which, for example, CuKα rays are used as X-rays, and high purity silicon is used as a standard substance ("Carbon fiver," Sugiro Otani, pp. 733-742, 1986, Kindai Hensyu).

Further, the bulk density of the graphite is, for example, preferably 1.2 g/cm3 or more, and the breaking strength thereof is, for example, preferably 50 MPa or more. Thereby, even when the anode active material layer 22B is pressed to increase the volume density, the lamella structure of the graphite can be maintained, and insertion and extraction reaction of lithium can be smoothly maintained. The breaking strength of graphite particles can be obtained from Mathematical formula 1:

$$St(Sx) = 2.8\, P/(\pi \times d \times d) \qquad \text{Mathematical formula 1}$$

where St(Sx) represents the breaking strength (MPa), P represents the force (N) in the test, and d represents the average particle diameter (mm) of the particles. The average particle diameter d can be measured by, for example, a laser diffraction particle size measuring device.

As a non-graphitizable carbon, for example, the non-graphitizable carbon in which the spacing of the (002) plane is 0.37 nm or more, the true density is less than 1.70 g/cm3, and the exothermic peak is not shown at 700 deg C. or more in the differential thermal analysis (DTA) in the air is preferable.

Further, in the secondary battery, by increasing the thicknesses of the cathode active material layer 21B and the anode active material layer 22B, the volumes of the cathode current collector 21A, the anode current collector 22A, and the separator 23 in the battery can be relatively decreased, and the energy density can be improved. However, when the thicknesses thereof are excessively increased, the lithium ion acceptance is lowered, and thus the battery characteristics such as the heavy loading characteristics and the cycle characteristics may be lowered. Therefore, the thickness of the cathode active material layer 21B is preferably, for example, from 75 μm to 120 μm for a single face of the cathode current collector 21A, and from 150 μm to 240 μm for the both faces of the cathode current collector 21A in total. The thickness of the anode active material layer 22B is preferably, for example, from 75 μm to 120 μm for a single face of the anode current collector 22A, and from 150 μm to 240 μm for the both faces of the anode current collector 22A in total. Further, when the anode active material layer 22B is formed by using graphite in which the lattice spacing d002 is 0.335 nm or more and less than 0.338 nm as an anode active material, the volume density of the anode active material layer 22B is preferably from 1.0 g/cm3 to 1.9 g/cm3. By forming the anode active material layer 22B containing the foregoing graphite with such a volume density, the active material amount capable of being inserted in the battery is sufficiently secured, the high energy density is secured, and the lithium ion acceptance is improved.

A separator 23 separates the cathode 21 from the anode 22, prevents current short circuit due to contact of the both electrodes, and lets through lithium ions. The separator 23 is made of, for example, a porous material of a synthetic resin such as polytetrafluoroethylene, polypropylene, and polyethylene, or a ceramics porous material. The separator 23 may have a porous film structure in which two or more of the foregoing porous materials are mixed or layered. Specially, the porous film made of polyolefin is preferable, since the porous film made of polyolefin has the superior short circuit prevention effect and provides improved safety of the battery by shut down effect. In particular, as a material of the separator 23, polyethylene is preferable, since polyethylene provides shutdown effects in the range from 100 deg C. to 160 deg C. and has superior electrochemical stability. Further, polypropylene is also preferable. In addition, as long as a resin has chemical stability, such a resin may be used by being copolymerized with polyethylene or polypropylene, or by being blended with polyethylene or polypropylene.

An electrolytic solution is impregnated in the separator 23. The electrolytic solution contains, for example, a solvent and an electrolyte salt.

The solvent contains difluoroethylene carbonate, and may further contain other one or more materials by mixing. By using difluoroethylene carbonate, a favorable coat can be formed on the anode 22. Thus, as described above, even when the thickness of the anode active material layer 22B is increased, the diffusion and the electrochemical acceptance of lithium ions in the anode 22 can be improved. Further, the coat formed from difluoroethylene carbonate is thin and dense. Therefore, the lithium amount used for forming the coat is small, the charge and discharge efficiency is improved, and superior heavy loading characteristics can be obtained.

As difluoroethylene carbonate, for example, 4-4-difluoro-1,3-dioxolan-2-one, cis-4,5-difluoro-1,3-dioxolan-2-one, or trans-4,5-difluoro-1,3-dioxolan-2-one can be cited. Specially, trans-4,5-difluoro-1,3-dioxolan-2-one is preferable, since thereby higher effects can be obtained. A mixture of any combination of 4-4-difluoro-1,3-dioxolan-2-one, cis-4,5-difluoro-1,3-dioxolan-2-one and trans-4,5-difluoro-1,3-dioxolan-2-one can be used as well.

The content of difluoroethylene carbonate in the solvent is preferably from 0.1 wt % to 20 wt %. Within such a range, higher effects can be obtained.

As other solvents, for example, an ambient temperature molten salt such as ethylene carbonate, propylene carbonate, butylene carbonate, vinylene carbonate, dimethyl carbonate, diethyl carbonate, ethyl methyl carbonate, γ-butyrolactone, γ-velerolactone, 1,2-dimethoxyethane, tetrahydrofuran, 2-methyltetrahydrofuran, 1,3-dioxolan, 4-methyl-1,3-dioxolan, methyl acetate, methyl propionate, ethyl propionate, acetonitrile, glutaronitrile, adiponitrile, methoxyacetonitrile, 3-methoxypropiononitrile, N,N-dimethylformamide, N-methylpyrrolidinone, N-methyloxazolidinone, nitromethane, nitroethane, sulfolane, dimethylsulfoxide, trimethyl phosphate, triethyl phosphate, ethylene sulfite, and bistrifluoromethylsulfonylimidetrimethylhexyl ammonium can be cited. Specially, propylene carbonate or vinylene carbonate is preferably contained in the solvent, since thereby superior charge and discharge capacity characteristics and charge and discharge cycle characteristics can be obtained.

As an electrolyte salt, for example, a lithium salt such as lithium hexafluorophosphate (LiPF6), imide lithium bis(pentafluoroethanesulfonyl) (Li(C2F5SO2)2N), lithium perchlorate (LiClO4), lithium hexafluoroarsenate (LiAsF6), lithium tetrafluoroborate (LiBF4), lithium trifluoromethanesulfonate (LiSO3CF3), imide lithium bis(trifluoromethanesulfonyl) (Li(CF3SO2)2N), methyl lithium tris(trifluoromethanesulfonyl) (LiC(SO2CF3)3), lithium chloride (LiCl), and lithium bromide (LiBr) can be cited. One of the foregoing electrolyte salts may be used singly, or two or more thereof may be used by mixing. Specially, lithium hexafluorophosphate (LiPF6) is preferably contained.

The secondary battery can be manufactured, for example, as follows.

First, for example, the cathode 21 is formed by forming the cathode active material layer 21B on the cathode current collector 21A. A cathode active material, an electrical conductor, and a binder are mixed to prepare a cathode mixture, which is dispersed in a solvent such as N-methyl-2-pyrrolidone to obtain paste cathode mixture slurry. Subsequently, the cathode current collector 21A is coated with the cathode mixture slurry, and the solvent is dried. After that, the resultant is compression-molded by a rolling press machine or the like to form the cathode active material layer 21B. Otherwise, the cathode active material layer 21B may be formed by adhering the cathode mixture on the cathode current collector 21A.

Further, for example, similarly to in the cathode 21, the anode 22 is formed by forming the anode active material layer 22B on the anode current collector 22A. A carbon material as an anode active material and a binder are mixed to prepare an anode mixture, which is dispersed in a solvent such as N-methyl-2-pyrrolidone to obtain paste anode mixture slurry. Subsequently, the anode current collector 22A is coated with the anode mixture slurry, and the solvent is dried. After that, the resultant is compression-molded by a rolling press machine or the like to form the anode active material layer 22B and thereby forming the anode 22. Otherwise, the anode active material layer 22B may be formed by adhering the anode mixture on the anode current collector 22A.

Next, the cathode lead 25 is attached to the cathode current collector 21A by welding or the like, and the anode lead 26 is attached to the anode current collector 22A by welding or the like. After that, the cathode 21 and the anode 22 are spirally wound with the separator 23 in between. The end of the cathode lead 25 is welded to the safety valve mechanism 15, and the end of the anode lead 26 is welded to the battery can 11. The spirally wound cathode 21 and the spirally wound anode 22 are sandwiched between the pair of insulating plates 12 and 13, and contained in the battery can 11. After the cathode 21 and the anode 22 are contained in the battery can 11, the electrolytic solution is injected into the battery can 11 and impregnated in the separator 23. After that, at the open end of the battery can 11, the battery cover 14, the safety valve mechanism 15, and the PTC device 16 are fixed by being caulked with the gasket 17. The secondary battery shown in FIG. 1 is thereby completed.

In the secondary battery, when charged, for example, lithium ions are extracted from the cathode active material layer 21B, and inserted in the anode active material layer 22B through the electrolytic solution. When discharged, for example, lithium ions are extracted from the anode active material layer 22B, and inserted in the cathode active material layer 21B through the electrolytic solution. Here, in this embodiment, the thicknesses of the cathode active material layer 21B and the anode active material layer 22B are increased. Therefore, the areas of the cathode current collector 21A and the anode current collector 22A are relatively decreased, and the current density to the anode 22 when charged is increased. However, in this embodiment, difluoroethylene carbonate is contained in the electrolytic solution. Therefore, the favorable coat is formed on the anode 22. Consequently, even if the current density to the anode 22 is high, the diffusion and the electrochemical acceptance of lithium ions in the anode 22 are improved, and metal lithium is prevented from being precipitated in the anode 22. Further, decomposition of the electrolytic solution due to charge and discharge is inhibited by the effects of the coat.

As described above, in this embodiment, the appropriate thicknesses of the cathode active material layer 21B and the anode active material layer 22B are secured. Therefore, while the energy density is improved, the favorable heavy loading characteristics and the favorable cycle characteristics can be obtained. Further, in this embodiment, the electrolytic solution contains difluoroethylene carbonate as a solvent. Therefore, the favorable coat is formed on the anode 22. Consequently, even when the thickness of the anode active material layer 22B is increased, diffusion and the acceptance of lithium ions in the anode 22 can be improved, and decomposition of the electrolytic solution due to charge and discharge can be inhibited. In the result, metal lithium is prevented from being precipitated in the anode 22, and the cycle characteristics can be more improved. In particular, when the content of difluoroethylene carbonate in the solvent is from 0.1 wt % to 20 wt %, higher effects can be obtained.

Further, as a carbon material contained in the anode active material layer 22B, graphite in which the lattice spacing d002 in the C-axis direction calculated by X-ray diffraction is 0.335 nm or more and less than 0.338 nm is used, a higher energy density is obtained. In this embodiment, difluoroethylene carbonate is contained in the electrolytic solution. Therefore, even when the graphite has the small lattice spacing d002, intercalation of lithium ions at the edge of the graphite crystal is smoothly conducted, and the battery characteristics such as the cycle characteristics are not deteriorated. That is, lithium ion acceptance almost equal to that of a carbon material with the lattice spacing of 0.338 nm or more can be secured. It may result from the fact as follows. That is, lithium ions are rapidly moved at the edge, and as a result, the lithium insertion rate to the interlayer is improved.

Furthermore, when the anode active material layer 22B is formed by using the graphite in which the lattice spacing d002 is 0.335 nm or more and less than 0.338 nm as an anode active material, and the volume density of the anode active material layer 22B is from 1.0 g/cm3 to 1.9 g/cm3, the active material amount capable of being inserted in the battery is sufficiently secured, the high energy density is secured, and the lithium ion acceptance is improved. In this case, in particular, by coating effects of difluoroethylene carbonate, a high energy density is obtained, and the superior cycle characteristics are obtained.

EXAMPLES

Further, specific examples of the application will be described in detail.

Examples 1-1 to 1-7 and Comparative examples 1-1 to 1-9

The cylinder type secondary batteries shown in FIGS. 1 and 2 were fabricated. First, lithium carbonate (Li2CO3) and cobalt carbonate (CoCO3) were mixed at the molar ratio of Li2CO3:CoCO3=0.5:1. The resultant mixture was fired for 5 hours at 900 deg C. in the air to obtain lithium cobalt complex oxide (LiCoO2). When X-ray diffraction was performed for the obtained LiCoO2, the result well corresponded with the peak of LiCoO2 registered in the JCPDS (Joint Committee of Powder Diffraction Standard) file. Next, the lithium cobalt complex oxide was pulverized to obtain powder in which the accumulated 50% particle diameter obtained by laser diffraction method was 15 μm as a cathode active material.

Subsequently, 95 wt % of the lithium cobalt complex oxide powder and 5 wt % of lithium carbonate (Li2CO3) powder were mixed. Then, 94 wt % of the resultant mixture, 3 wt % of Ketjen black as an electrical conductor, and 3 wt % of polyvinylidene fluoride as a binder were mixed. The resultant mixture was dispersed in N-methyl-2-pyrrolidone as a solvent to obtain cathode mixture slurry. Next, the both faces of the cathode current collector 21A made of a strip-shaped aluminum foil being 20 μm thick were uniformly coated with the cathode mixture slurry, which was dried and compression-molded to form the cathode active material layer 21B and thereby forming the cathode 21. Then, the thickness of a single face of the cathode active material layer 21B was 88 μm, and the volume density was 3.55 g/cm3. After that, the cathode lead 25 made of aluminum was attached to one end of the cathode current collector 21A.

Further, 90 wt % of granular graphite powder with the average particle diameter of 25 μm as an anode active material and 10 wt % of polyvinylidene fluoride as a binder were mixed. The resultant mixture was dispersed in N-methyl-2-pyrrolidone as a solvent to obtain anode mixture slurry. The property of the graphite used as an anode active material was as follows. That is, the lattice spacing d002 in the C-axis direction calculated by X-ray diffraction was 0.3363 nm.

Next, the both faces of the anode current collector 22A made of a strip-shaped copper foil being 15 μm thick were uniformly coated with the anode mixture slurry, which was dried and compression-molded to form the anode active material layer 22B and thereby forming the anode 22. At that time, the thickness of a single face of the anode active material layer 22B was 90 μm, and the volume density was 1.80 g/cm3. Subsequently, the anode lead 26 made of nickel was attached to one end of the anode current collector 22A.

After the cathode 21 and the anode 22 were respectively formed, the cathode 21 and the anode 22 were sandwiched with the separator 23 made of a micro porous polyethylene stretched film being 25 μm thick in between. Then the anode 22, the separator 23, the cathode 21, and the separator 23 were layered in this order, and the resultant lamination was spirally wound many times. Thereby, the jelly roll-shaped spirally wound electrode body 20 was formed. Next, the spirally wound electrode body 20 was sandwiched between the pair of insulating plates 12 and 13. The anode lead 26 was welded to the battery can 11, the cathode lead 25 was welded to the safety valve mechanism 15, and the spirally wound electrode body 20 was contained in the battery can 11. Subsequently, an electrolytic solution was injected into the battery can 11, the battery cover 14 and the battery can 11 were caulked with the gasket 17, and thereby the cylinder type secondary battery was fabricated.

For the electrolytic solution, an electrolytic solution obtained by dissolving lithium hexafluorophosphate as an electrolyte salt in a mixed solvent of trans-4,5-difluoro-1,3-dioxolan-2-one, ethylene carbonate (EC), diethyl carbonate (DEC), and propylene carbonate (PC) at the ratio shown in Table 1 so that lithium hexafluorophosphate became 1 mol/kg was used. The content of trans-4,5-difluoro-1,3-dioxolan-2-one in the solvent was changed in the range from 0.05 wt % to 25 wt %.

As Comparative example 1-1 relative to Examples 1-1 to 1-7, a secondary battery was fabricated as in Examples 1-1 to 1-7, except that trans-4,5-difluoro-1,3-dioxolan-2-one was not mixed in the electrolytic solution. Further, as Comparative example 1-2, secondary battery was fabricated as in Examples 1-1 to 1-7, except that the thickness of a single face of the anode active material layer 22B was 60 μm and trans-4,5-difluoro-1,3-dioxolan-2-one was not mixed in the electrolytic solution. Further more, as Comparative examples 1-3 to 1-9, secondary batteries were fabricated as in Examples 1-1 to 1-7, except that the thickness of a single face of the anode active material layer 22B was 60 μm.

For the fabricated secondary batteries of Examples 1-1 to 1-7 and Comparative examples 1-1 to 1-9, charge and discharge were performed, and the battery capacity, the initial charge and discharge efficiency, and the cycle characteristics were examined. Charge was performed as follows. After charge was performed at the constant current of 1 C until the battery voltage reached 4.2 V, charge was performed at the constant voltage of 4.2 V until the total charge time reached 4 hours. Discharge was performed at the constant current of 1 C until the battery voltage reached 3.0 V. 1 C represents the current value with which the theoretical capacity can be completely discharged in 1 hour. The battery capacity was the initial discharge capacity (discharge capacity at the first cycle). The cycle characteristics were obtained as the discharge capacity ratio at the 100th cycle to the initial discharge capacity (discharge capacity at the first cycle), that is, (discharge capacity at the 100th cycle/discharge capacity at the first cycle)×100 (%). The results are shown in Tables 1 and 2. The battery capacity is expressed as a relative value where the value of Comparative example 1-1 is 100. Further, in Tables 1 and 2, trans-4,5-difluoro-1,3-dioxolan-2-one is simply shown as DFEC.

TABLE 1

Anode active material layer: volume density: 1.80 g/cm$^3$

| | Composition of solvent (wt %) | | | | LiPF$_6$ | Thickness of single face of anode active material layer | Battery capacity (relative | Cycle characteristics |
| --- | --- | --- | --- | --- | --- | --- | --- | --- |
| | EC | DEC | DFEC | PC | (mol/kg) | (μm) | value) | (%) |
| Example 1-1 | 47.975 | 47.975 | 0.05 | 4.0 | 1 | 90 | 100 | 68.6 |
| Example 1-2 | 47.95 | 47.95 | 0.1 | 4.0 | 1 | 90 | 100 | 79.0 |
| Example 1-3 | 47.5 | 47.5 | 1.0 | 4.0 | 1 | 90 | 100 | 82.3 |
| Example 1-4 | 45.5 | 45.5 | 5.0 | 4.0 | 1 | 90 | 100 | 88.8 |
| Example 1-5 | 43.0 | 43.0 | 10.0 | 4.0 | 1 | 90 | 100 | 92.3 |
| Example 1-6 | 38.0 | 38.0 | 20.0 | 4.0 | 1 | 90 | 100 | 80.9 |
| Example 1-7 | 35.5 | 35.5 | 25.0 | 4.0 | 1 | 90 | 100 | 69.6 |
| Comparative example 1-1 | 48.0 | 48.0 | 0 | 4.0 | 1 | 90 | 100 | 52.2 |

EC: ethylene carbonate,
DEC: diethyl carbonate,
DFEC: trans-4,5-difluoro-1,3-dioxolan-2-one,
PC: propylene carbonate

TABLE 2

Anode active material layer: volume density: 1.80 g/cm$^3$

| | Composition of solvent (wt %) | | | | LiPF$_6$ | Thickness of single face of anode active material layer | Battery capacity (relative | Cycle characteristics |
| --- | --- | --- | --- | --- | --- | --- | --- | --- |
| | EC | DEC | DFEC | PC | (mol/kg) | (μm) | value) | (%) |
| Comparative example 1-2 | 48.0 | 48.0 | 0 | 4.0 | 1 | 60 | 91.3 | 92.0 |
| Comparative example 1-3 | 47.975 | 47.975 | 0.05 | 4.0 | 1 | 60 | 91.3 | 93.1 |
| Comparative example 1-4 | 47.95 | 47.95 | 0.1 | 4.0 | 1 | 60 | 91.3 | 93.8 |
| Comparative example 1-5 | 47.5 | 47.5 | 1.0 | 4.0 | 1 | 60 | 91.3 | 94.1 |
| Comparative example 1-6 | 45.5 | 45.5 | 5.0 | 4.0 | 1 | 60 | 91.3 | 95.2 |
| Comparative example 1-7 | 43.0 | 43.0 | 10.0 | 4.0 | 1 | 60 | 91.3 | 95.6 |
| Comparative example 1-8 | 38.0 | 38.0 | 20.0 | 4.0 | 1 | 60 | 91.3 | 93.4 |
| Comparative example 1-9 | 35.5 | 35.5 | 25.0 | 4.0 | 1 | 60 | 91.3 | 92.8 |

EC: ethylene carbonate,
DEC: diethyl carbonate,
DFEC: trans-4,5-difluoro-1,3-dioxolan-2-one,
PC: propylene carbonate As shown in Table 1, in Examples 1-1 to 1-7 and Comparative example 1-1 in which the thicknesses of the anode active material layer 22B was increased, the cycle characteristics could be largely improved in Examples 1-1 to 1-7 in which trans-4,5-difluoro-1,3-dioxolan-2-one was added, compared to those in Comparative example 1-1 in which trans-4,5-difluoro-1,3-dioxolan-2-one was not added. Further, based on the results of Table 1 and Table 2, it was confirmed that comparing two anode active material layers 22B using the same carbon material and having the same volume density, the anode active material layer 22B with the increased thickness could provide a larger battery capacity. As shown in Table 2, in Comparative examples 1-2 to 1-9 in which the thicknesses of the anode active material layer 22B was decreased, even in Comparative example 1-2 in which trans-4,5-difluoro-1,3-dioxolan-2-one was not added, the cycle characteristics were relatively favorable. Thus, it was found that when the thickness of the anode active material layer 22B was decreased, large improvement effect due to addition of trans-4,5-difluoro-1,3-dioxolan-2-one was not shown.

That is, it was found that by increasing the thicknesses of the anode active material layer 22B, a high battery capacity could be secured. Meanwhile, by adding trans-4,5-difluoro-1,3-dioxolan-2-one to the electrolytic solution, superior cycle characteristics could be realized.

For the cycle characteristics, in Examples 1-2 to 1-6, as the content ratio of trans-4,5-difluoro-1,3-dioxolan-2-one in the solvent was increased, the cycle characteristics were gradually improved, and then decreased. Thereby, it was found that in particular, when the content ratio of trans-4,5-difluoro-1,3-dioxolan-2-one in the solvent was 0.1 wt % to 20 wt %, more favorable cycle characteristics were shown.

Examples 2-1 and 2-2

Secondary batteries were fabricated as in Example 1-4, except that instead of trans-4,5-difluoro-1,3-dioxolan-2-one, cis-4,5-difluoro-1,3-dioxolan-2-one was used for the solvent in the electrolytic solution in Example 2-1, and 4-4-difluoro-1,3-dioxolan-2-one was used for the solvent in the electrolytic solution in Example 2-2.

For the secondary batteries of Examples 2-1 and 2-2, the cycle characteristics were examined as in Example 1-4. The results are shown in Table 3 together with the results of Example 1-4 and Comparative example 1-1. The battery capacity is also shown. The battery capacity is a relative value where the value of Comparative example 1-4 is 100.

TABLE 3

Anode active material layer: volume density: 1.80 g/cm$^3$
Thickness of single face of anode active material layer: 90 μm

| | Composition of solvent (wt %) | | | | | | $LiPF_6$ | Battery capacity | Cycle characteristics |
|---|---|---|---|---|---|---|---|---|---|
| | EC | DEC | \_\_\_\_DFEC\_\_\_\_ | | | PC | (mol/kg) | (relative value) | (%) |
| | | | 1 | 2 | 3 | | | | |
| Example 1-4 | 45.5 | 45.5 | 5.0 | 0 | 0 | 4.0 | 1 | 100 | 88.8 |
| Example 2-1 | 45.5 | 45.5 | 0 | 5.0 | 0 | 4.0 | 1 | 100 | 86.9 |
| Example 2-2 | 45.5 | 45.5 | 0 | 0 | 5.0 | 4.0 | 1 | 100 | 84.5 |
| Comparative example 1-1 | 48.0 | 48.0 | 0 | 0 | 0 | 4.0 | 1 | 100 | 52.2 |

EC: ethylene carbonate,
DEC: diethyl carbonate,
DFEC1: trans-4,5-difluoro-1,3-dioxolan-2-one,
DFEC2: cis-4,5-difluoro-1,3-dioxolan-2-one
DFEC3: 4-4-difluoro-1,3-dioxolan-2-one
PC: propylene carbonate As shown in Table 3, in Examples 2-1 and 2-2, the battery capacity equal to Example 1-4 was secured and the good cycle characteristics were obtained. However, it was confirmed that Example 2-1 in which cis-4,5-difluoro-1,3-dioxolan-2-one was contained as the solvent had superior cycle characteristics to Example 2-2 in which 4-4-difluoro-1,3-dioxolan-2-one was contained as the solvent. Further, it was confirmed that Example 1-4 in which trans-4,5-difluoro-1,3-dioxolan-2-one was contained as the solvent had superior cycle characteristics to Example 2-1.

Examples 3-1 to 3-3 and Comparative Examples 3-1 to 3-5

Secondary batteries were fabricated as in Example 1-4, except that the thickness of a single face of the anode active material layer 22B was changed as shown in Table 4. Specifically, in Example 3-1, the thickness of a single face of the anode active material layer 22B was 75 μm. In Example 3-2, the thickness of a single face of the anode active material layer 22B was 100 μm. In Example 3-3, the thickness of a single face of the anode active material layer 22B was 120 μm.

As Comparative example 3-1 relative to Examples 3-1 to 3-3, a secondary battery was fabricated as in Example 1-4, except that the thickness of a single face of the anode active material layer was 130 μm. Further, in Comparative examples 3-2 to 3-4, secondary batteries were fabricated as in Examples 3-1 to 3-3, except that trans-4,5-difluoro-1,3-dioxolan-2-one was not added to the electrolytic solution. In Comparative example 3-5, a secondary battery was fabricated as in Comparative example 3-1, except that trans-4,5-difluoro-1,3-dioxolan-2-one was not added to the electrolytic solution.

For the fabricated secondary batteries of Examples 3-1 to 3-3 and Comparative examples 3-1 to 3-5, the battery capacity, the initial charge and discharge efficiency, and the cycle characteristics were examined as in Example 1-4. The results are shown in Table 4 together with the results of Example 1-4 and Comparative examples 1-1, 1-2, and 1-6. The battery capacity is shown as a relative value where the value of Comparative example 1-1 is 100.

TABLE 4

| | Composition of solvent (wt %) | | | | LiPF$_6$ | Thickness of single face of anode active material layer | Battery capacity (relative | Cycle characteristics |
|---|---|---|---|---|---|---|---|---|
| | EC | DEC | DFEC | PC | (mol/kg) | (μm) | value) | (%) |
| Comparative example 1-6 | 45.5 | 45.5 | 5.0 | 4.0 | 1 | 60 | 91.3 | 95.2 |
| Example 3-1 | 45.5 | 45.5 | 5.0 | 4.0 | 1 | 75 | 95.7 | 91.2 |
| Example 1-4 | 45.5 | 45.5 | 5.0 | 4.0 | 1 | 90 | 100 | 88.8 |
| Example 3-2 | 45.5 | 45.5 | 5.0 | 4.0 | 1 | 100 | 100.8 | 86.4 |
| Example 3-3 | 45.5 | 45.5 | 5.0 | 4.0 | 1 | 120 | 102.2 | 81.2 |
| Comparative example 3-1 | 45.5 | 45.5 | 5.0 | 4.0 | 1 | 130 | 104.3 | 58.8 |
| Comparative example 1-2 | 48.0 | 48.0 | 0 | 4.0 | 1 | 60 | 91.3 | 92.0 |
| Comparative example 3-2 | 48.0 | 48.0 | 0 | 4.0 | 1 | 75 | 95.7 | 76.7 |
| Comparative example 1-1 | 48.0 | 48.0 | 0 | 4.0 | 1 | 90 | 100 | 52.2 |
| Comparative example 3-3 | 48.0 | 48.0 | 0 | 4.0 | 1 | 100 | 100.8 | 50.7 |
| Comparative example 3-4 | 48.0 | 48.0 | 0 | 4.0 | 1 | 120 | 102.2 | 47.8 |
| Comparative example 3-5 | 48.0 | 48.0 | 0 | 4.0 | 1 | 130 | 104.3 | 41.0 |

Anode active material layer: volume density: 1.80 g/cm$^3$

EC: ethylene carbonate,
DEC: diethyl carbonate,
DFEC: trans-4,5-difluoro-1,3-dioxolan-2-one,
PC: propylene carbonate As shown in Table 4, in Examples 1-4 and 3-1 to 3-3 in which the thickness of the anode active material layer 22B was from 75 μm to 120 μm and trans-4,5-difluoro-1,3-dioxolan-2-one was contained, the cycle characteristics could be largely improved, respectively compared to Comparative examples 1-1 and 3-2 to 3-4 in which the thickness of the anode active material layer 22B was respectively the same as that of Examples 1-4 and 3-1 to 3-3 but trans-4,5-difluoro-1,3-dioxolan-2-one was not contained. Further, compared to Comparative example 1-6 in which the thickness of the anode active material layer 22B was 60 μm, in Examples 1-4 and 3-1 to 3-3, though the cycle characteristics were deteriorated, the high battery capacity was shown. Further, compared to Comparative example 3-1 in which the thickness of the anode active material layer 22B was 130 μm, in Examples 1-4 and 3-1 to 3-3, though the battery capacity was slightly lowered, the cycle characteristics were largely improved. It would appear that Comparative example 3-1 shows slightly higher cycle characteristics due to coating effect of trans-4,5-difluoro-1,3-dioxolan-2-one.

That is, it was found that when the thickness of the anode active material layer 22B was from 75 μm to 120 μm, and the electrolytic solution contains trans-4,5-difluoro-1,3-dioxolan-2-one, a high battery capacity and superior cycle characteristics could be obtained. In addition, it was found that as the battery capacity was larger, the effects due to adding trans-4,5-difluoro-1,3-dioxolan-2-one to the electrolytic solution significantly contributed to improvement of the cycle characteristics. It was confirmed that such a tendency appeared not only in the case using trans-4,5-difluoro-1,3-dioxolan-2-one, but also in the case using 4-4-difluoro-1,3-dioxolan-2-one and cis-4,5-difluoro-1,3-dioxolan-2-one.

Examples 4-1, 4-2 and Comparative Examples 4-1, 4-2

As Examples 4-1 and 4-2, secondary batteries were fabricated as in Example 1-4, except that as a carbon material contained in the anode active material layer 22B, graphite with the different value of the lattice spacing d002 was used. Specifically, in Example 4-1, graphite with the lattice spacing d002 of 0.3385 nm was used. In Example 4-2, graphite with the lattice spacing d002 of 0.3380 nm was used.

As Comparative examples 4-1 and 4-2 relative to Examples 4-1 and 4-2, secondary batteries were fabricated as in Examples 4-1 and 4-2, except that trans-4,5-difluoro-1,3-dioxolan-2-one was not added to the electrolytic solution.

For the secondary batteries of Examples 4-1, 4-2 and Comparative examples 4-1, 4-2, the cycle characteristics were examined as in Example 1-4. The results are shown in Table 5 together with the results of Example 1-4 and Comparative example 1-1. The volume density of the anode active material layer 22B contained in the anode 22 of the fabricated secondary batteries was also shown. The battery capacity is expressed as a relative value where the value of Comparative example 1-1 is 100.

TABLE 5

Anode active material layer: thickness of a single face: 90 μm

| | Composition of solvent (wt %) | | | | LiPF$_6$ | Lattice spacing | Volume density | Battery capacity (relative | Cycle Characteristics |
|---|---|---|---|---|---|---|---|---|---|
| | EC | DEC | DFEC | PC | (mol/kg) | d$_{002}$ (nm) | (g/cm$^3$) | value) | (%) |
| Example 1-4 | 45.5 | 45.5 | 5.0 | 4.0 | 1 | 0.3363 | 1.80 | 100 | 88.8 |
| Example 4-1 | 45.5 | 45.5 | 5.0 | 4.0 | 1 | 0.3380 | 1.20 | 89.1 | 89.1 |
| Example 4-2 | 45.5 | 45.5 | 5.0 | 4.0 | 1 | 0.3385 | 1.15 | 87.0 | 94.6 |
| Comparative example 1-1 | 48.0 | 48.0 | 0 | 4.0 | 1 | 0.3363 | 1.80 | 100 | 52.2 |
| Comparative example 4-1 | 48.0 | 48.0 | 0 | 4.0 | 1 | 0.3380 | 1.20 | 89.1 | 82.3 |
| Comparative example 4-2 | 48.0 | 48.0 | 0 | 4.0 | 1 | 0.3385 | 1.15 | 87.0 | 91.2 |

EC: ethylene carbonate,
DEC: diethyl carbonate,
DFEC: trans-4,5-difluoro-1,3-dioxolan-2-one,
PC: propylene carbonate As shown in Table 5, comparing Examples 1-4, 4-1, and 4-2 in which trans-4,5-difluoro-1,3-dioxolan-2-one was contained in the electrolytic solution to Comparative examples 1-1, 4-1, and 4-2 in which trans-4,5-difluoro-1,3-dioxolan-2-one was not contained, higher cycle characteristics were shown in Examples 1-4, 4-1 and 4-2. In view of the lattice spacing d002, as the lattice spacing d002 was larger, the volume density of the anode active material layer 22B was lowered, and accordingly the battery capacity was lowered. In addition, as the lattice spacing d002 was larger, though the cycle characteristics were improved, significant improvement effects due to adding trans-4,5-difluoro-1,3-dioxolan-2-one were not observed. However, when the lattice spacing d002 was less than 0.3380 nm, the high battery capacity was secured, and significant improvement of the cycle characteristics due to coating effects of trans-4,5-difluoro-1,3-dioxolan-2-one was shown. Though not shown in the examples, in each secondary battery of Examples 4-1 and 4-2 using graphite with the different value of the lattice spacing d002, when the thickness of the anode active material layer 22B was from 75 μm to 120 μm and the electrolytic solution contained trans-4,5-difluoro-1,3-dioxolan-2-one, a high battery capacity and superior cycle characteristics are obtained as well.

That is, it was found that when the thickness of the anode active material layer 22B was from 75 μm to 120 μm and the electrolytic solution contained trans-4,5-difluoro-1,3-dioxolan-2-one, a high battery capacity and superior cycle characteristics could be obtained regardless of the value of the lattice spacing d002 of graphite used as a carbon material. In particular, it was found that when graphite with the lattice spacing d002 of less than 0.3380 nm was used as a carbon material, a higher battery capacity was secured, and superior cycle characteristics could be obtained. It was confirmed that such a tendency appeared not only in the case using trans-4,5-difluoro-1,3-dioxolan-2-one, but also in the case using 4-4-difluoro-1,3-dioxolan-2-one and cis-4,5-difluoro-1,3-dioxolan-2-one.

The application has been described with reference to the embodiment and the examples. However, the application is not limited to the embodiment and the examples, and various modifications may be made. For example, in the foregoing embodiment and the foregoing examples, descriptions have been given of the battery using lithium as an electrode reactant. However, the application can be applied to the case using other alkali metal such as sodium (Na) and potassium (K), an alkali earth metal such as magnesium and calcium (Ca), or other light metal such as aluminum. The cathode active material or the like capable of inserting and extracting the electrode reactant is selected according to the electrode reactant.

Further, in the foregoing embodiment and the foregoing examples, descriptions have been given of the cylinder type secondary battery having the spirally winding structure. However, the application can be similarly applied to an oval type or polygonal type secondary battery having a spirally winding structure, an other-shaped secondary battery in which a cathode and an anode are folded, or an other-shaped secondary battery in which a plurality of cathodes and a plurality of anodes are layered. In addition, the application can be applied to an other-shaped secondary battery such as a coin type battery, a button type battery, a square type battery, and a laminated film type battery.

Further, in the foregoing embodiment and the foregoing examples, both the thickness of the anode active material layer and the thickness of the cathode active material layer are increased more than a usual thickness. However, the thickness of the cathode active material layer may be reduced, for example, to the degree that the thickness of a single face thereof is about from 55 μm to 75 μm, and the total thickness of the both faces is about from 110 μm to 150 μm.

Further, in the foregoing embodiment and the foregoing examples, descriptions have been given of the case using the liquid electrolytic solution as an electrolyte. However, a gelatinous electrolyte obtained by holding an electrolytic solution in a holding body such as a polymer compound may be used. As such a polymer compound, for example, polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethacrylic acid methyl, polyacrylic acid, polymethacrylic acid, styrene-butadiene rubber, nitrile-butadiene rubber, polystyrene, or polycarbonate can be cited. In particular, in terms of electrochemical stability, polyacrylonitrile, polyvinylidene fluoride, polyhexafluoropropylene, or polyethylene oxide is preferable. The ratio of the polymer compound to the electrolytic solution varies according to the compatibility thereof. In general, however, the polymer compound corresponding to 5 wt % to 50 wt % of the electrolytic solution is preferably added.

Further, in the foregoing embodiment and the foregoing examples, descriptions have been given of the appropriate ranges derived from the results of the examples for the thicknesses of the anode active material layer, the lattice spacing d002 in the C-axis direction calculated by X-ray diffraction of the carbon material, and the content ratio of difluoroethylene carbonate contained in the electrolytic solution in the battery of the application. However, the foregoing descriptions may have a possibility that parameters such as the thickness become out of the foregoing ranges. That is, the foregoing appropriate ranges are particularly preferable ranges to obtain the effects of the application. As long as the effects of the application can be obtained, parameters such as the thickness may be slightly deviated from the foregoing ranges.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising:
a cathode;
an anode; and
an electrolytic solution,
wherein the anode has an anode active material layer containing a carbon material and being from 100 µm to 120 µm thick, and
the electrolytic solution contains a solvent containing trans-4,5-difluoro -1,3-dioxolane-2-one.

2. The battery according to claim 1, wherein the carbon material includes graphite in which a lattice spacing $d_{002}$ in the C-axis direction in X-ray diffraction is 0.335 nm or more and less than 0.338 nm.

3. The battery according to claim 1, wherein a content of trans-4,5-difluoro-1,3-dioxolane-2-one in the solvent is from 0.1 wt % to 20 wt %.

4. The battery according to claim 2, wherein a volume density of the anode active material layer is from 1.0 g/cm$^3$ to 1.9 g/cm$^3$.

5. The battery according to claim 1, wherein the solvent contains propylene carbonate.

6. The battery according to claim 1, wherein the carbon material has a spacing of the (002) plane of 0.3363 nm or more or 0.3380 nm or less.

7. The battery according to claim 1, wherein the cathode includes a cathode active material containing $Li_xMIO_2$ and $Li_2CO_3$ wherein 0.05<x<1.10, and MI includes at least one transition metal.

* * * * *